United States Patent Office 3,699,001
Patented Oct. 17, 1972

3,699,001
PREPARATION OF BROMELAIN FROM PINEAPPLE STEMS
Pinnan Soong, 12, Lane 322 Ta-Tung Road, Tainan, Taiwan, Kiangsu, China
No Drawing. Filed Jan. 2, 1970, Ser. No. 427
Int. Cl. C07g 7/022
U.S. Cl. 195—66 R   10 Claims

ABSTRACT OF THE DISCLOSURE

A practical and economical process for increasing the yield, the purity, the activity and longer shelf-life of bromelain from pineapple stems extracting juice from low temperature treatment of stems, fractionally precipitating bromelain from clarified juice with organic compound and releasing bromelain precipitate with chilled oxygen compounds.

---

This invention relates to the novel process for the production of proteolytic enzymes from plant juices, with a particular reference to the production of bromelain from expressed pineapple stem juice.

Bromelain, a special kind of enzyme, is produced from crushed pineapple stem juice, with more or less success, by conventional methods (such as, U.S. Pat. 3,002,891). However, commercial bromelain so obtained is usually too low in activity and keepability. A primary object of the present invention is to provide a process for the production of a highly active and stable pineapple bromelain, which will retain its full potency after a reasonable length of storage time. A further object of the present invention is to provide a novel extraction procedure for obtaining the maximum yield of enzyme-rich juice from pineapple stems.

I found, in the present invention, that by introducing an intermediate step of deep freezing and thawing of the sliced pineapple stem, prior to pressing in an expeller press, the cell walls of the sliced stem are disrupted so effectively that much more enzyme-rich juice can be obtained from the same raw material than the conventional mechanical pressure treatment without preliminary freezing and thawing. I also found, in the present invention, that by introducing the technique of differential precipitation with tannic acid, a superior product of bromelain with a higher potency and longer shelf-life is obtained from the pineapple stem juice than is obtainable by conventional methods.

The following specific example are illustrative of the process of the present invention, but it is to be understood that it is not to be limited to the specific details thereof:

The peeled stems are washed with water to remove soils from the surface of the stems, and sliced to about one centimeter in thickness and frozen at $-5°$ to $-20°$ C., and then thawed. The thawed sliced stems are dropped into the first expeller press, 35–40% of the juice is extracted in the first press, the pulp is dropped into the second expeller, cooled water is sprayed to the pulp to increase the efficiency of the extraction.

EXTRACTION OF THE ENZYMES FROM THE STEMS

Temperature effect on enzyme yield

| Temperature, °C. | Time, hr. | Juice/kg. stems, ml. | Enzyme in juice, BTU[1]/ml. | Units/Kg stems BTU[1]/kg |
|---|---|---|---|---|
| 30 | 24 | 340 | 6.66 | 2,266 |
| 5 | 24 | 214 | 11.46 | 2,452 |
| −20 | 24 | 478 | 13.92 | 6,654 |

[1] BTU=Bromelain Tyrosine Unit is that amount of enzyme which will produce 1 millimole of tyrosine per minute under the conditions of the assay.

Yield of bromelain per kg. of the peeled stems at room temperature is lower than at lower temperatures. Freezing and thawing of the stem has an effect of softening the fibre tissue and disrupting or breaking the cell walls, thus enabling the juice and enzymes to be easily extracted by the press.

RELATION OF FREEZING TIME AND EXTRACTION

| Temperature, °C. | Time, Hr. | Juice/kg. stems, ml. | Enzyme in juice, BTU/ml. | Enzyme/ kg. stems, BTU/kg. |
|---|---|---|---|---|
| −20 | 2 | 216 | 10.00 | 2,160 |
| −20 | 24 | 478 | 13.92 | 6,654 |
| −20 | 48 | 483 | 14.28 | 6,897 |
| −20 | 72 | 488 | 14.06 | 6,861 |

The heart of the stems cannot be cooled down to $-20°$ C. in the freezer within two hours. Holding the stem at $-20°$ C. for 24 hours gives optimum yield of pressed juice and enzyme units.

EFFECT OF DIFFERENT PRESSES ON EXTRACTION OF ENZYME FROM THE STEMS

| Treatment | Juice/kg. stem, ml. | Enzyme in juice, BTU/ml. | Enzyme in stems, BTU/kg. |
|---|---|---|---|
| Freezing, then test mill and hydraulic press | 190 | 18.96 | 3,606 |
|  | 410 | 20.82 | 8.53$ |
|  | 600 |  | 12,137 |
| Freezing, then hydraulic press | 590 | 14.15 | 8,348 |

The efficiency of our laboratory test mill is very low, however, followed by hydraulic press, the yield of enzymes is 45% higher than treated with hydraulic press only.

The first and second expressed juices are mixed and screened to remove any coarse particles, and passed immediately through a cooling coil, keeping the juice at 0–4° C. in a tank in the cooling room. After overnight settling, large amount of impurities such as starch, soils and cell walls precipitated on the bottom, the supernatant is decanted, the sludge is centrifuged or filtered. Or the cooled crude juice is centrifuged immediately without settling. The liquid is not very clear, owing to large amount of cytoplasm or proteins suspended in the juice. 0.02–0.1%, (based on weight) of tannic acid is added into the cooled juice and agitated for 30 minutes or more, then centrifuged or filtered to remove the impurities.

The addition of a small amount of tannic acid to coagulate proteins other than bromelain in the juice, to increase the efficiency of the clarification of the juice is preferred, although some enzymes are also bonded by tannic acid and lost in the residue.

Precipitation of the enzymes from the clarified juice

The conventional methods for precipitation of enzymes from the juice, are either precipitate by solvents, such as alcohols or acetone, or by salts e.g. ammonium sulfate. The solvent precipitation has a denaturing effect on the enzymes. With use of ammonium sulfate, the precipitates must be dialyzed to remove the excess salts and the dialysis method is very difficult to apply in large scale production.

It is the object of the present invention, to provide a better precipitation process, which I found by addition of 0.5 to 1.0% tannic acid to the clarified cooled juice, a heavy precipitation of the enzyme-tannic acid complex is formed, which is filtered off, and the filter cake further purified as follows.

Purification of the enzymes

Different kinds of solvent has been used to wash the cake, and I found that chilled acetone is better than methyl and ethyl alcohols. Treated with alcohols, the color of the final product is darker than that with acetone even when the potencies are nearly the same. However, when the cakes were first treated with alcohol and then followed with acetone, an attractive whitish color accompanied by higher potency are found in the final powder. The final recovery of enzymes from the juice was more than 80%.

When the purified precipitates are dried under vacuum, the product is always active without the addition of any activators to the enzyme solutions. The powdered products has been kept unchanged in a glass bottle, left on the desk without any additional care for one year, except the moisture content of the powder is slightly higher, because the stopper of the bottle is not airtight.

What is claimed is:

1. A process for producing a stable bromelain comprising freezing and thawing pineapple stems whereby the cell walls are disrupted so that more bromelain-rich juice can be obtained when a force is applied to the thawed pineapple stems, then (1) extracting the juice from cooled pineapple stems by a force, (2) precipitating the bromelain from chilled and clarified juice by tannic acid and (3) releasing the bromelain precipitate with a chilled oxygen compound chosen from the group consisting of an alcohol and a ketone.

2. A process for producing a stable bromelain comprising freezing and thawing pineapple stems whereby the cell walls are disrupted so that more bromelain-rich juice can be obtained when a force is applied to the thawed pineapple stems, then (1) extracting the juice from thawed pineapple stems by a shearing and pressing force, (2) precipitating the bromelain from chilled and clarified juice by tannic acid and (3) releasing the bromelain precipitate with a chilled oxygen compound chosen from the group consisting of an alcohol and a ketone.

3. A process for producing a stable bromelain comprising freezing and thawing pineapple stems whereby the cell walls are disrupted so that more bromelain-rich juice can be obtained when a force is applied to the thawed pineapple stems, then (1) extracting the juice from thawed pineapple stems by a shearing and pressing force, (2) fractionally precipitating the bromelain from chilled and clarified juice by tannic acid and (3) releasing the bromelain precipitate with a chilled oxygen compound chosen from the group consisting of an alcohol and a ketone.

4. A process for producing a stable bromelain comprising freezing and thawing pineapple stems whereby the cell walls are disrupted so that more bromelain-rich juice can be obtained when a force is applied to the thawed pineapple stems, then (1) extracting the juice from thawed pineapple stems by expeller, (2) fractionally precipitating the bromelain from chilled and clarified juice by tannic acid and (3) releasing the bromelain precipitate with a chilled oxygen compound chosen from the group consisting of a ketone.

5. A process for producing a stable bromelain comprising freezing and thawing pineapple stems whereby the cell walls are disrupted so that more bromelain-rich juice can be obtained when a force is applied to the thawed pineapple stems, then (1) extracting the juice from thawed pineapple stems by expeller and hydraulic press, (2) fractionally precipitating the bromelain from chilled and clarified juice by tannic acid and (3) releasing the bromelain precipitate with a chilled oxygen compound chosen from the group consisting of an alcohol and a ketone.

6. A process for producing a stable bromelain comprising freezing and thawing pineapple stems whereby the cell walls are disrupted so that more bromelain-rich juice can be obtained when a force is applied to the thawed pineapple stems, then (1) extracting the juice from thawed pineapple stems by sugar mill and hydraulic press, (2) fractionally precipitating the bromelain from chilled and clarified juice by tannic acid and (3) releasing the bromelain precipitate with a chilled oxygen compound chosen from the group consisting of an alcohol and a ketone.

7. A process for producing a stable bromelain comprising freezing and thawing pineapple stems whereby the cell walls are disrupted so that more bromelain-rich juice can be obtained when a force is applied to the thawed pineapple stems, then (1) extracting the juice from thawed pineapple stems by expeller and hydraulic press, (2) fractionally precipitating the bromelain from chilled and clarified juice by tannic acid and (3) releasing the bromelain precipitate with chilled ethyl alcohol and acetone.

8. A process for producing a stable bromelain comprising freezing and thawing pineapple stems whereby the cell walls are disrupted so that more bromelain-rich juice can be obtained when a force is applied to the thawed pineapple stems, then (1) extracting the juice from thawed pineapple stems by expeller and hydraulic press, (2) fractionally precipitating the bromelain from chilled and clarified juice by tannic acid and (3) releasing the bromelain precipitate with chilled methyl alcohol and acetone.

9. A process for producing a stable bromelain comprising freezing and thawing pineapple stems whereby the cell walls are disrupted so that more bromelain-rich juice can be obtained when a force is applied to the thawed pineapple stems, then (1) extracting the juice from 0° C. to −30° C. from thawed pineapple stems by expeller and hydraulic press, (2) fractionally precipitating the bromelain with tannic acid at first at most 0.1% to remove impurities and then at least 0.3% by weight of the said chilled and clarified juice and (3) releasing the bromelain precipitate with a chilled oxygen compound chosen from the group consisting of an alcohol and a ketone.

10. A process for producing a stable bromelain comprising freezing and thawing pineapple stems whereby the cell walls are disrupted so that more bromelain-rich juice can be obtained when a force is applied to the thawed pineapple stems, then (1) extracting the juice from 0° C. to −30° C. for 24 hours from thawed pineapple stems by expeller, (2) precipitating the bromelain from chilled and clarified juice by 0.3% to 1.2% of tannic acid by weight of the said juice and (3) releasing the bromelain precipitate with chilled acetone.

References Cited

UNITED STATES PATENTS

| | | | |
|---|---|---|---|
| 3,002,891 | 10/1961 | Heinicke | 195—66 R |
| 3,147,196 | 9/1964 | Ziegler et al. | 195—66 |
| 3,455,787 | 7/1969 | Makay | 195—66 |
| 3,475,277 | 10/1969 | Heinicke | 195—66 |

OTHER REFERENCES

Dixon et al.: Enzymes, 2nd ed., 1964, pp. 33–34.
Methods in Enzymology, vol. I, pp. 62–63 (1956).

LIONEL M. SHAPIRO, Examiner